United States Patent
Greifeneder et al.

(10) Patent No.: US 9,451,017 B2
(45) Date of Patent: Sep. 20, 2016

(54) METHOD AND SYSTEM FOR COMBINING TRACE DATA DESCRIBING MULTIPLE INDIVIDUAL TRANSACTION EXECUTIONS WITH TRANSACTION PROCESSING INFRASTRUCTURE MONITORING DATA

(71) Applicant: Compuware Corporation, Detroit, MI (US)

(72) Inventors: Bernd Greifeneder, Linz (AT); Andreas Lehofer, St. Florian (AT)

(73) Assignee: Dynatrace LLC, Waltham, MA (US)

( * ) Notice: Subject to any disclaimer, the term of this patent is extended or adjusted under 35 U.S.C. 154(b) by 183 days.

(21) Appl. No.: 14/338,637

(22) Filed: Jul. 23, 2014

(65) Prior Publication Data

US 2015/0032884 A1    Jan. 29, 2015

Related U.S. Application Data

(60) Provisional application No. 61/857,747, filed on Jul. 24, 2013.

(51) Int. Cl.
| | |
|---|---|
| *G06F 15/173* | (2006.01) |
| *H04L 29/08* | (2006.01) |
| *H04L 12/26* | (2006.01) |
| *G06F 11/30* | (2006.01) |
| *G06F 11/34* | (2006.01) |

(52) U.S. Cl.
CPC .............. *H04L 67/10* (2013.01); *G06F 11/30* (2013.01); *G06F 11/3495* (2013.01); *H04L 43/04* (2013.01); *H04L 43/0817* (2013.01); *H04L 67/22* (2013.01)

(58) Field of Classification Search
USPC ................................................ 709/224, 203
See application file for complete search history.

(56) References Cited

U.S. PATENT DOCUMENTS

| | | | |
|---|---|---|---|
| 8,234,631 B2 | 7/2012 | Greifeneder et al. | |
| 2008/0109870 A1* | 5/2008 | Sherlock | H04L 63/1425 726/1 |
| 2008/0235365 A1* | 9/2008 | Bansal | H04L 43/06 709/224 |
| 2009/0049429 A1* | 2/2009 | Greifeneder | G06F 11/3495 717/128 |
| 2012/0304172 A1 | 11/2012 | Greifeneder et al. | |
| 2013/0185643 A1 | 7/2013 | Greifeneder et al. | |
| 2014/0052624 A1 | 2/2014 | Bansal et al. | |
| 2014/0136693 A1 | 5/2014 | Greifeneder et al. | |

* cited by examiner

*Primary Examiner* — Philip B Tran
(74) *Attorney, Agent, or Firm* — Harness, Dickey & Pierce, P.L.C.

(57) ABSTRACT

A transaction monitoring and tracing system which combines transactional performance monitoring aspects with infrastructure performance and utilization measures, like e.g. used memory or CPU load of transaction executing computing infrastructure. The system uses two types of agents deployed to the monitored system, a transaction and process agent, which is deployed to a process executing monitored transactions, and a host agent, which is deployed to a computer system executing processes monitored by a transaction and process agent. The transaction and process agent provides transaction tracing and process infrastructure measurements, the host agent provides host or operating system infrastructure measurements. All three types of measurements are tagged by the corresponding agent in a way that allows a later correlation of corresponding tracing and measurement data by an external monitoring node. Combining transactional and infrastructure monitoring allows fast detection of non-transactional root causes of monitored transaction performance degradations.

30 Claims, 14 Drawing Sheets

METHOD AND SYSTEM FOR COMBINING TRACE DATA DESCRIBING MULTIPLE INDIVIDUAL TRANSACTION EXECUTIONS WITH TRANSACTION PROCESSING INFRASTRUCTURE MONITORING DATA

CROSS-REFERENCE TO RELATED APPLICATIONS

This application claims the benefit of U.S. Provisional Application No. 61/857,747, filed on Jul. 24, 2013. The entire disclosure of the above application is incorporated herein by reference.

FIELD

The present disclosure relates to performance monitoring of individual distributed transaction in conjunction with performance and utilization monitoring of corresponding transaction executing computing environment. Transaction tracing data and infrastructure monitoring data is correlated and combined based on timing and execution location data of parts of the distributed transactions.

BACKGROUND

Large, web-based applications, like e-commerce applications are typically executed and hosted by data-centers that provide the required execution infrastructure like host computers, processes running on those host computers and interconnecting computer networks. Such data-centers are often used by a set of different applications, partially or fully sharing the same execution infrastructure. In addition, this infrastructure may also be used to perform cyclic tasks that are not directly related to application execution, like e.g. backup jobs.

In such a situation, where different applications and background jobs compete for the same shared resources like CPU cycles or main memory of a computer system, monitoring systems that only provide transaction execution tracing and monitoring data may be able to identify and report performance degradations related to transaction executions, but they fail to provide data that allows to identify non-transaction based root causes of transaction performance degradation.

Infrastructure monitoring systems that provide measurement data describing load and utilization of execution infrastructure like host computing systems or processes only allow a coarse correlation of detected infrastructure problems with affected applications, e.g. in situations with hard-wired assignment of hosts or processes to specific applications. In more dynamic setups, where e.g. allocation of processing infrastructure is based on the current application load, the identification of applications or transactions affected by detected processing infrastructure problems based on infrastructure monitoring data alone is not possible.

The identification of non-transactional root causes of detected transaction performance degradations requires manual identification of processing infrastructure involved in the execution of the transactions showing performance degradations, followed by an also manual timing analysis, which compares the time frame of the detected transaction degradation with the load and utilization situation of involved hosts or processes during transaction execution time.

To identify the applications and or transactions affected by an identified host or process infrastructure problem, a manual analysis of execution timing and location of monitored transaction is required to identify those monitored transactions or applications that used the specific processing infrastructure during the time when the infrastructure problem persisted.

Due to the manual nature of the described correlation processes, the accuracy of the provided results is often insufficient and the processes require time consuming and often cumbersome human intervention.

Consequently, a method and system is required that integrates transaction oriented with infrastructure performance monitoring, and that allows a free and frictionless switch between those two aspects. This section provides background information related to the present disclosure which is not necessarily prior art.

SUMMARY

This section provides a general summary of the disclosure, and is not a comprehensive disclosure of its full scope or all of its features.

The methods and technologies described herein are directed to the combined tracing of individual distributed transaction and monitoring of computing infrastructure involved in the execution of parts of those traced distributed transactions. The described techniques allow to identify for each part of a traced distributed transaction the process that performed the described execution. Further, the described technologies allow to identify the host computing system that executes the process involved in the execution. The term "host computing system" is further used herein to describe the combination of hardware resources forming a computer system and an operating system that organizes, manages and provides such resources and that runs processes using such resources. A "host computing system" may either run on concrete or on virtualized hardware.

Resource utilization and health measures may cyclically be polled from processes involved in transaction executions and from hosts computing systems that run such processes. Those resource utilization and health measurements allow to identify the health and utilization state of processes involved in transaction execution during the execution of a specific part of a specific traced transaction.

This combined transaction execution tracing and transaction executing infrastructure monitoring data becomes extremely valuable in situations when e.g. transaction tracing data reveals a performance degradation, but the data collected from the transaction tracing system shows no transaction related performance issues like increased synchronization times etc. In such situations, a combined transaction tracing and infrastructure monitoring system may e.g. provide utilization and health measures of processes and host computing systems involved in the execution of the traced transactions that describe the utilization and health state of the involved processes and hosts during transaction execution. This allows to identify causes for transaction performance degradations that are outside of the scope of the traced transaction.

An example would e.g. a cyclic backup job that runs on a specific host computing system and requires the majority of available CPU resources while it runs, thus impacting the performance of transaction parts executing simultaneously on processes of the same host computing system. The combined transaction tracing and infrastructure monitoring system provides data that immediately reveals the connection between the running backup job and the observed transaction slowdown.

Additionally, such a combined tracing and monitoring system allows to identify transactions that are potentially affected by a detected computing infrastructure problem, like a full primary hard disc on a specific host computing system or a long running full garbage-collection run on a specific virtual machine. A combined transaction tracing and infrastructure monitoring system can be used to perform queries for traced transactions that are potentially affected by the detected host or process related infrastructure problem.

In an embodiment of the disclosed methods and technologies, agents may be deployed to processes executing monitored transactions, those agents may provide tracing data describing the execution of distributed transactions, and the tracing data may be forwarded to and processed by an external monitoring node according to the teachings of U.S. Pat. No. 8,234,631 "Method and system for tracing individual transactions at the granularity level of method calls throughout distributed heterogeneous applications without source code modifications" by Bernd Greifeneder et al. The deployed agents may in addition cyclically generate measures describing health and utilization of the process they are deployed to. The generated measures are tagged with correlation information that allows the identification of the specific process the measures correspond to. The generated measures are sent to the external monitoring node which also receives and processes the transaction tracing data. The external monitoring node maintains a transaction repository which contains received transaction tracing data in form of end-to-end transaction traces, and an infrastructure repository containing health and utilization measures describing the health and utilization history of processes involved in the execution of traced transactions. Additionally, the monitoring node may provide interfaces for combined transaction and infrastructure repository queries, to e.g. find transactions that used a specific process during a specific time period, or to find the processes used by a specific transaction and to show their specific health and utilization history.

Other embodiments of the described disclosure may additionally deploy host agents to host computing systems running monitored transactions. Those host agents may provide utilization and health measures describing the state of the host computer system as a whole. The measurements are tagged with correlation information that identifies the specific monitored host computing system and afterwards sent to the external monitoring node. The monitoring node may use those measures to maintain a utilization and health state of monitored host computer systems. The received host measurement may also, in combination with related process monitoring measures build and maintain "executed by" relationships. Those relationships may be used to identify which processes are running on which host computer system and in turn, which traced transactions are executed on which host computer system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an overview of an integrated transaction tracing and infrastructure monitoring system, consisting in a transaction and process agent deployed to a monitored application executing process, a host agent deployed to a host computer system running the application executing process and a remote monitoring node that receives, analyzes and combines transaction tracing and infrastructure monitoring data.

FIGS. 2A-C show event records which may be used to transfer transaction tracing and infrastructure monitoring data from an agent to a monitoring node.

FIG. 3 depicts the execution of an entry sensor capable to detect the first execution of an entry sensor within a thread and to create a transaction event record indicating the new detected thread execution and containing correlation information to identify host computer system and process of the thread execution.

FIGS. 4A-B show the processes of capturing host and process measurement data, capturing host and process identification and correlation data and combining and sending measurement and correlation data in a way that a remote monitoring node can identify the sending host or process.

FIGS. 5A-D show infrastructure data records which may be used by the monitoring node to model the infrastructure reported by connected agents in form of hosts and processes executed by hosts. The infrastructure data records also contain measurement and health history data that describe the historic and current health situation of the corresponding host or process.

FIGS. 6A-B show transaction data records which may be used by the monitoring node to describe parts of monitored transaction executions. The transaction data records may contain correlation data allowing to identify process and host that executed the specific transaction part.

Figure 10:
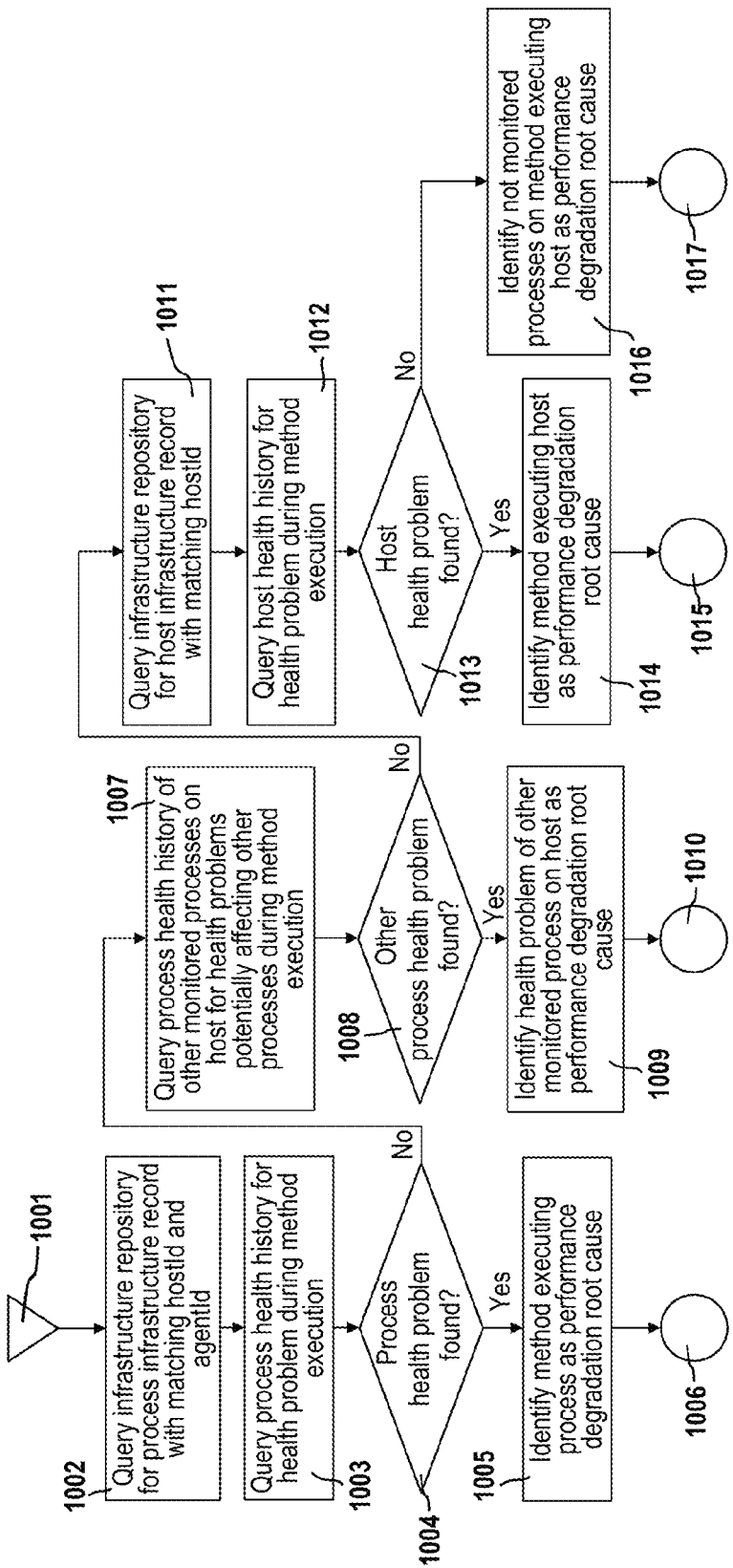

FIG. 10 exemplary shows a process that combines transaction and infrastructure repository data to identify infrastructure related root causes for a detected transaction related performance degradation.

Figure 11A:
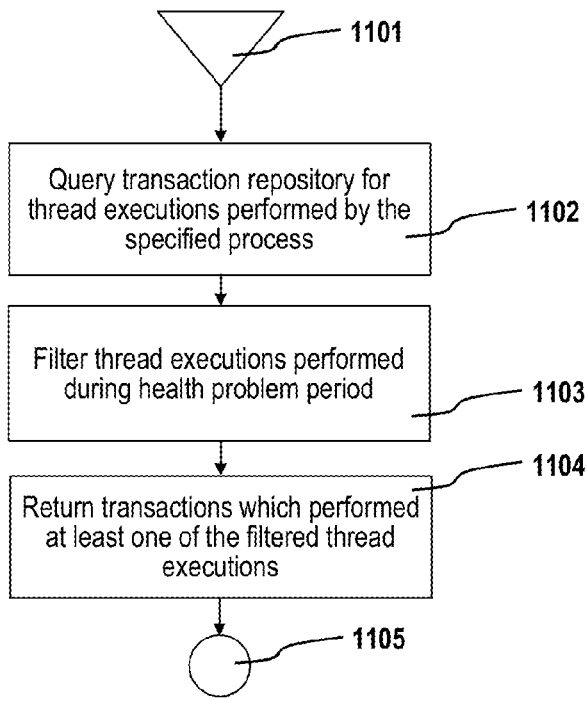
Figure 11B:
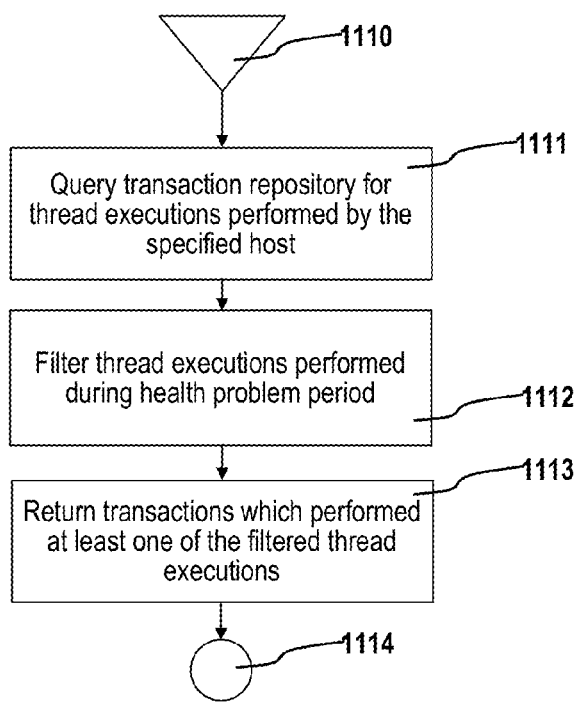

FIGS. 11A-B show the process of using the combined transaction and infrastructure repository data to identify transaction traces of transactions potentially affected by a health problem detected on a host or process.

Figure 12:
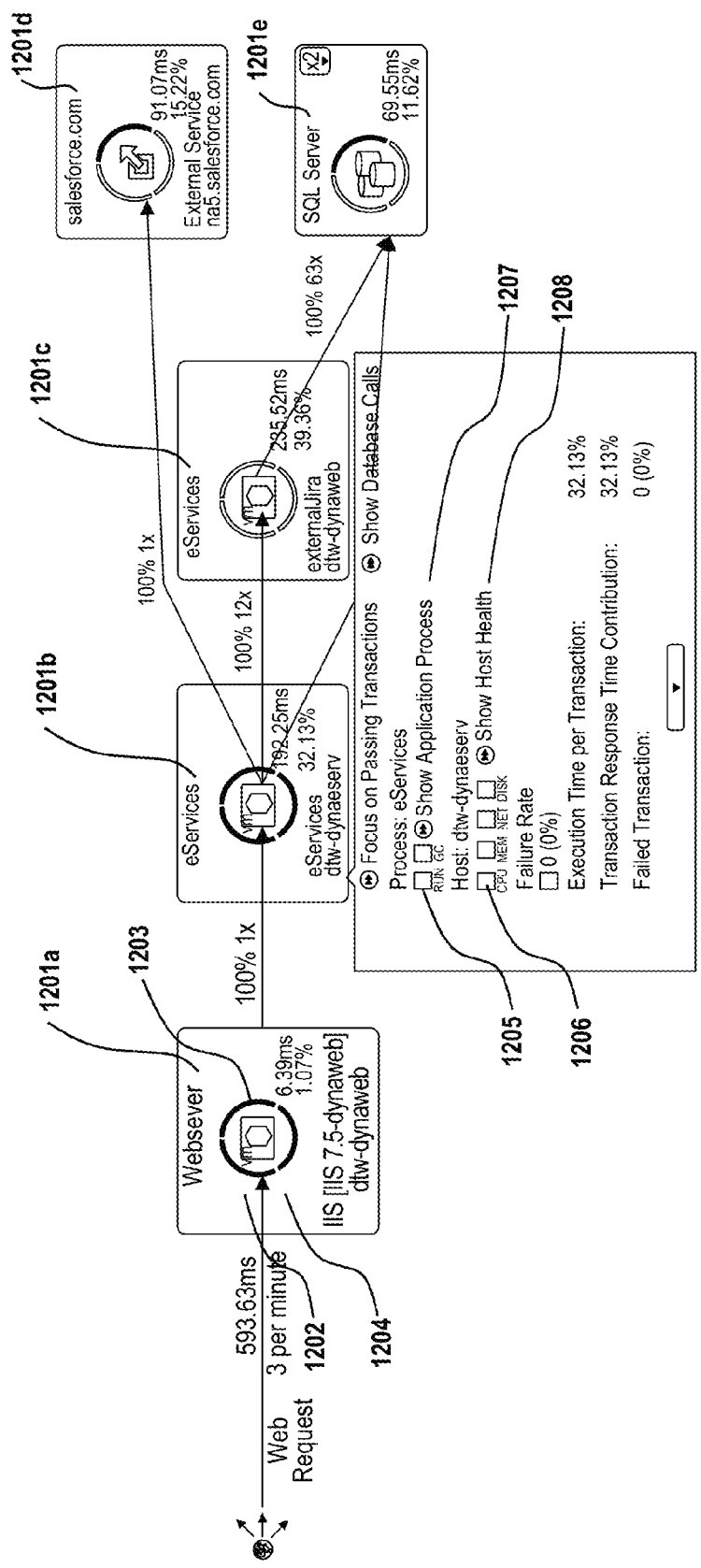

FIG. 12 shows an exemplary visualization of combined transaction tracing and infrastructure monitoring data, showing detail data of one exemplary process involved in the execution of a monitored transaction.

Figure 13A:
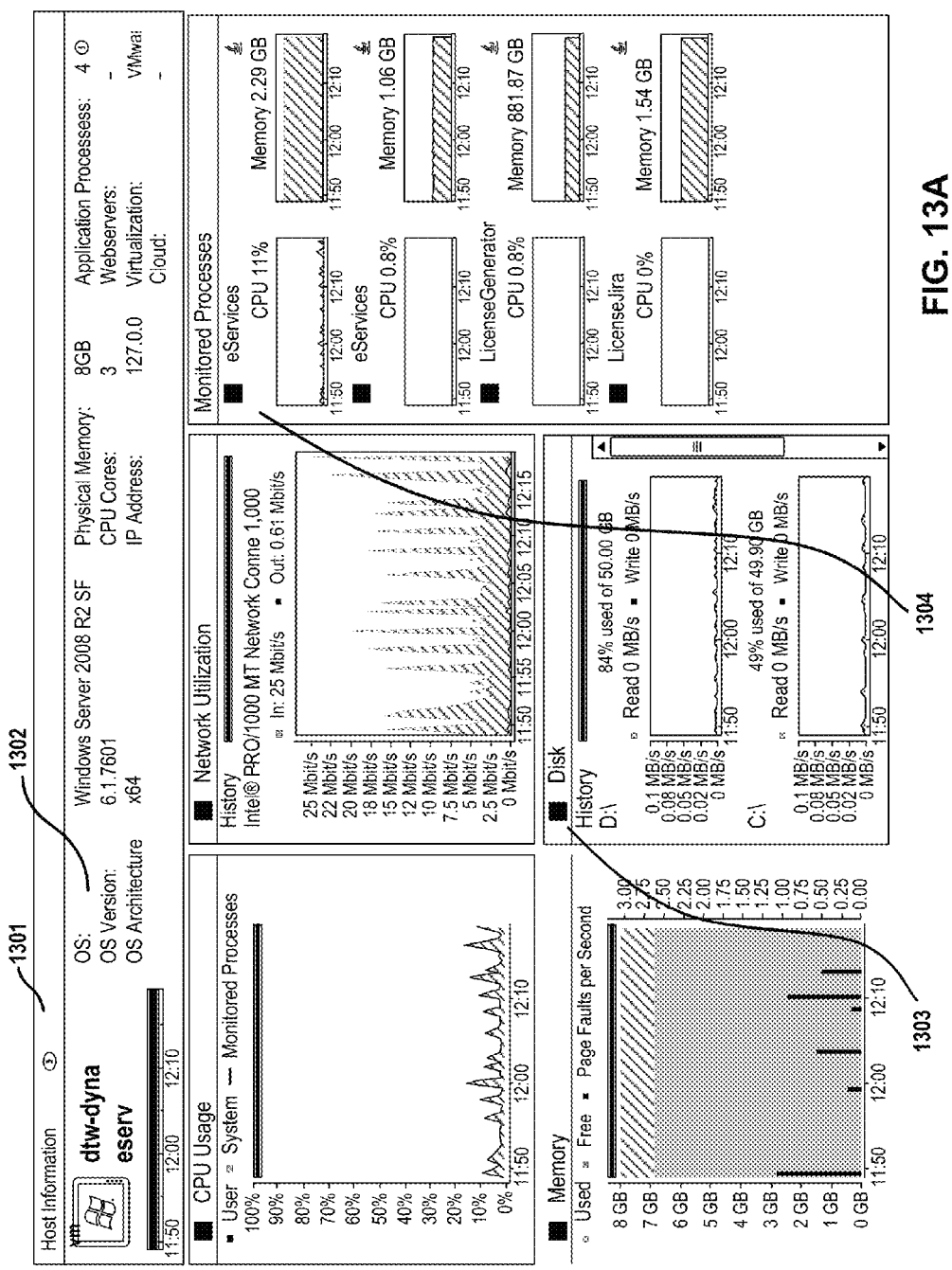
Figure 13B:
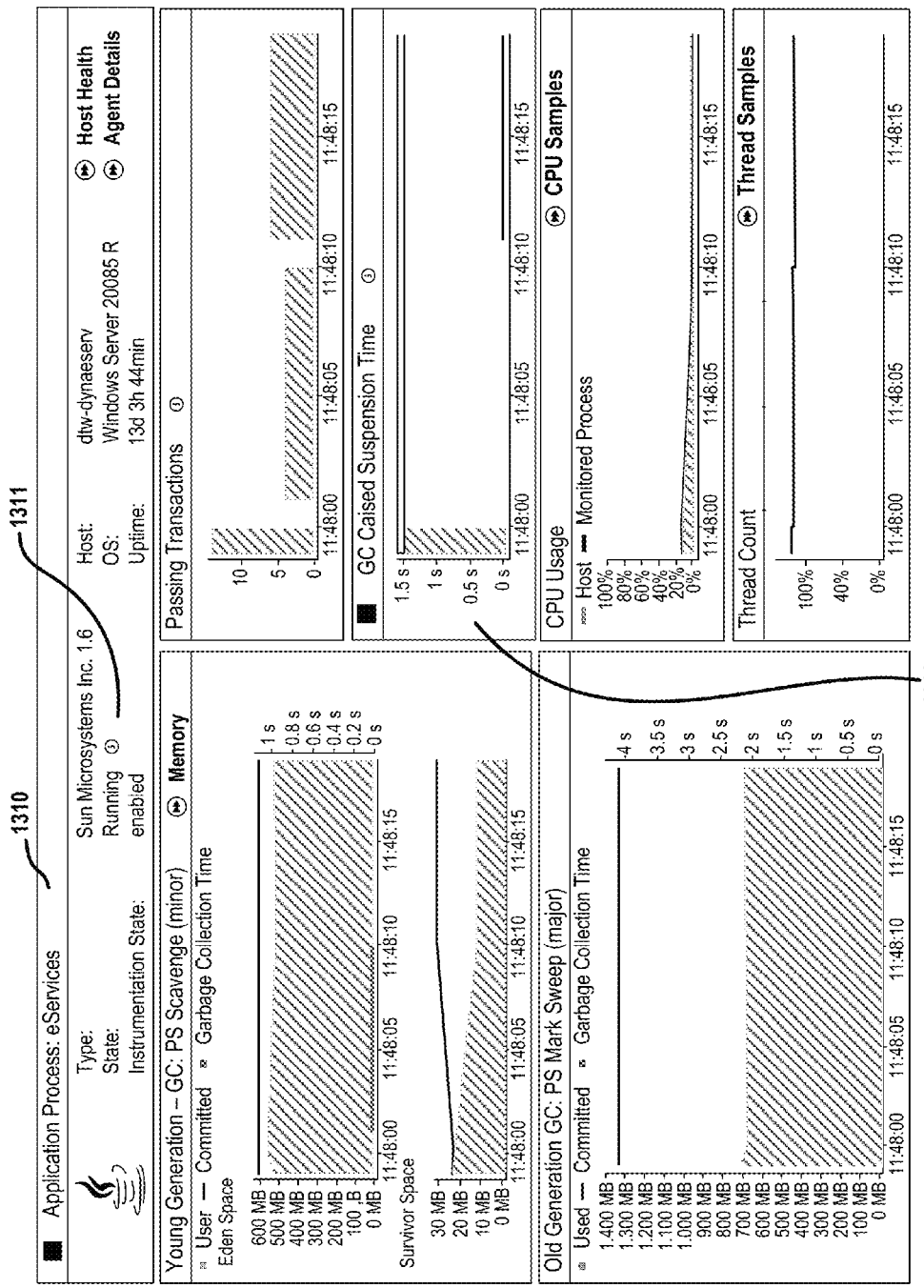

FIGS. 13A-B exemplary show the visualization of detailed health history of a host and a process being involved in the execution of a monitored transaction.

Corresponding reference numerals indicate corresponding parts throughout the several views of the drawings.

DETAILED DESCRIPTION

Example embodiments will now be described more fully with reference to the accompanying drawings. The described embodiments are directed to monitoring systems capable to combine transaction execution tracing and monitoring aspects with infrastructure utilization and health state monitoring aspects.

Transaction tracing data is tagged in a way that allows the identification of the process and host involved in the execution of each part of a traced transaction, and infrastructure monitoring data is tagged in a way that allows the identification of the described process or host. Transaction tracing agents and infrastructure monitoring agents use the same tagging mechanism to determine process or host identification data, which allows easy queries for infrastructure measures of hosts or processes involved in a specific transaction execution, or for transaction traces describing transaction that used a specific process or host.

Infrastructure measurements, as well as transaction tracing data contain timestamp data that identifies the point in time when a specific infrastructure measure was acquired or when a specific transaction event, like start or end of a specific method execution was performed by a transaction occurred.

The combined correlation and timestamp data can be used to match transaction tracing data with corresponding infrastructure monitoring data that describes the resource utilization and health state of processes and hosts used by a specific monitored transaction during the execution time of the transaction.

Figure 1:
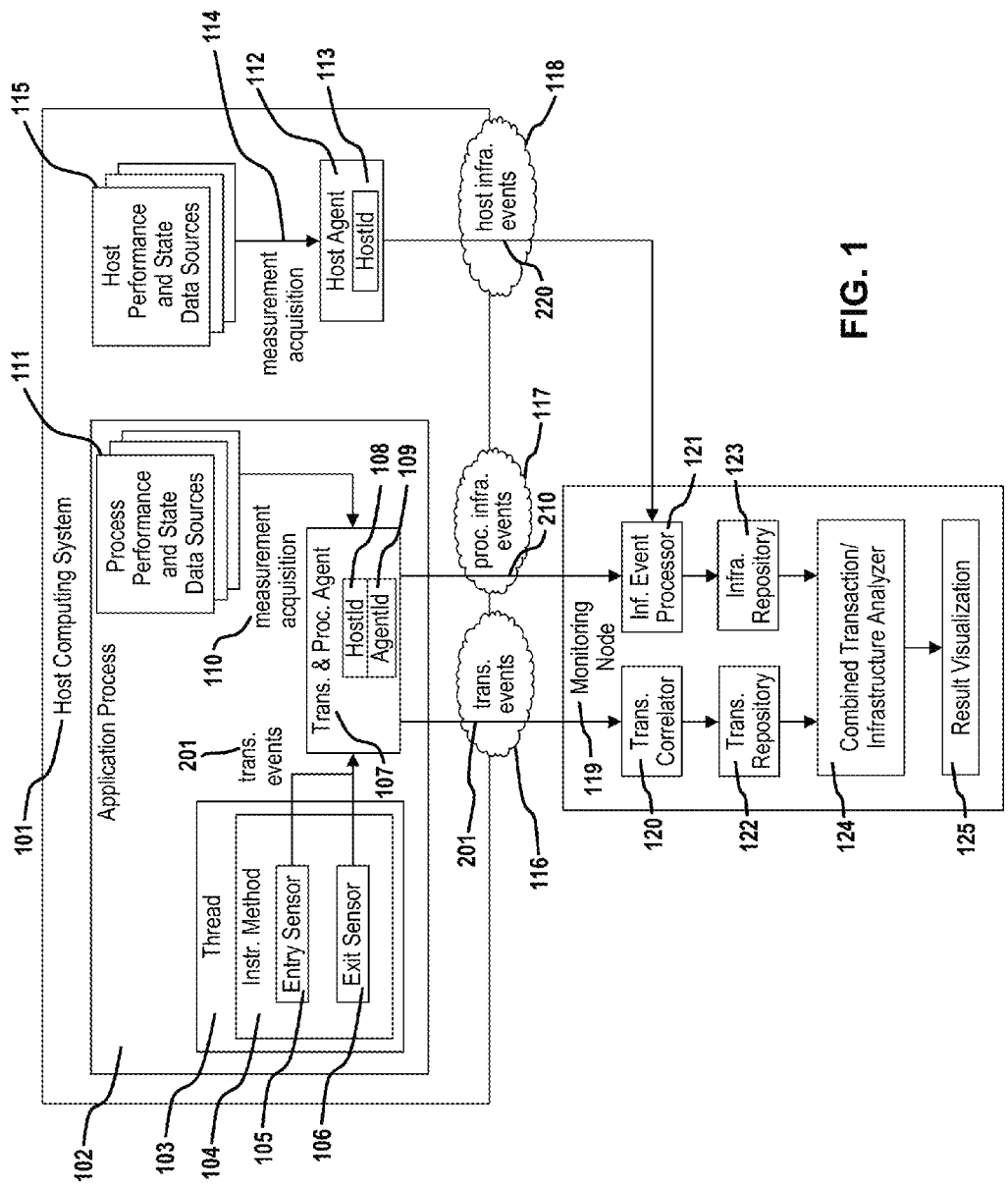

Referring now to FIG. 1, there is shown a block diagram of a combined transaction tracing and infrastructure monitoring system consisting in a transaction and process agent deployed to an application process performing at least parts of traced transactions, a host agent deployed to the host computing system executing the application process, and a monitoring node, potentially running on another host computer system and receiving transaction tracing data and infrastructure monitoring data from the deployed transaction and process agent and from the host agent. Multiple host agents may be deployed to multiple host computing systems and multiple transaction and process agents may be deployed to multiple application processes. Those multiple agent may connect and send event records to one monitoring node.

A host computing system 101, consisting in concrete or virtualized computer hardware and an operating system, is running an application process 102. The term application process as used here is defined as an instance of a computer program that is currently executed. Such an application process provides specific services dedicated to serve specific types of requests as defined by the executed computer program. Such application processes may execute a virtual machine, which in turn runs program code in byte code format dedicated to the type of executed virtual machine. Examples for such application processes would include processes providing services to process incoming HTTP request (Web Server) or processes running a virtual machine providing remote method execution services. Such processes may receive and handle various service requests simultaneously. Processing of such service requests requires resources which may be requested by the process from the operating system. One portion of the requests may be part of traced end-to-end transactions while another portion of those requests may not be traced. For requests being part of traced end-to-end transactions, detailed execution performance data, individually describing each request is available. For not traced requests, such individual data is not available. However, handling such requests also requires resources from the operating system. As the resources of the operating system are finite and traced and not traced requests compete for the same resources, the execution of not traced requests may influence the performance behavior of simultaneously executed traced requests.

A host computing system 101 may run multiple of such application processes 102, a portion of those multiple application processes may be monitored by an agent, and another portion of the application processes may not be monitored. Additionally, a host computer system may, next to application processes, run background processes not related to the execution of a monitored application but still requiring resources from the host computing system. Examples for such background processes include backup, cleanup or maintenance jobs.

A transaction and process agent 107 is deployed to the application process. Various sensors, like entry sensors 105 and exit sensors 106 are instrumented to the code executed by the application process. Those sensors are executed when an instrumented method 104 is executed within a thread 103 of the application to e.g. perform a part of a distributed transaction. The sensors register start and stop of the specific method execution and send corresponding notifications in form of transaction events 201 to the transaction and process agent 107. Thread correlation data to identify a specific thread execution within the scope of the current process as well as data to identify call sequence and nesting level of monitored method executions is added to the transaction events by sensors 105, 106 and agent 107. The agent 107 adds correlation data to identify the application process within the scope of the host computing system 101, e.g. in form of an agentId 109 to the transaction events 201 and additionally adds correlation data to identify the host computing system 101 that executes the application process 102 to the transaction events, e.g. in form of a hostId 108. The transaction events are further sent to a monitoring node 119 via a connecting computer network 116. Additionally, the transaction and process agent 107 cyclically queries various process performance and state data sources 111 to acquire process utilization and performance measures like the amount of memory currently used by the application process, CPU usage of the application process etc. 110. Virtual machine and operating system vendors provide well documented interfaces to query such performance data. The fetched measurements are sent to a monitoring node 119 in form of process infrastructure events 210 via a connecting computer network 117. Process infrastructure events also contain correlation data in form of an agentId 109 and a hostId 108. This embodiment describes a combined transaction and process agent. It would be possible to split the combined agent into a dedicated transaction and a dedicated process agent, as long as both dedicated agents provide the same hostId 108 and agentId 109.

Transaction agents, process agents and sensors may be injected into the monitored system by augmenting application specific code with monitoring specific code that performs acquisition of measurement data and execution context correlation data and communication with a monitoring node 119. The injection may either be performed permanent by manipulating source code of the monitored application and recompiling it, or it may be injected on the fly, during runtime of the monitored application. Runtime injection may be performed using byte-code instrumentation techniques for byte-code executing parts of the monitored application like Java™, .NET or PHP processes as described in U.S. Pat. No. 8,234,631 by Bernd Greifeneder et al. which is incorporated herein by reference in its entirety. It may also be performed by manipulating and injecting JavaScript™ code into HTML pages produced by the monitored applications and displayed by web browsers used to interact with the monitored application according to the teachings of U.S. patent application Ser. No. 13/722,026 "Method And System For Tracing End-To-End Transaction, Including Browser Side Processing And End User Performance Experience" and U.S. Ser. No. 14/056,016 "Method And System For Browser Based, Non-Intrusive Measuring Of End-User Perceived Performance Of Individual Third Party Resource Requests" both by Bernd Greifeneder et al. which are incorporated herein by reference in their entirety.

Sensors may also be implementing by hooking or modifying calls to the runtime environment of the monitored process indicating the execution of monitored methods in case of e.g. PHP or web server processes. Those hooks or modifications may be used to recognize the execution of specific methods, to capture execution context data like method parameters or return values and to send the captured data to a monitoring node 119 in form of transaction events 201. Sensors may also provide portions of end-to-end tracing data in cooperation with call-stack sampling technologies as described in U.S. patent application Ser. No. 13/455,764 "Method and System for Transaction Controlled Sampling of Distributed Heterogeneous Transactions without Source Code Modifications" by Bernd Greifeneder et al. which is incorporated herein by reference in its entirety.

A host agent 112 is deployed to the host computing system, which cyclically queries 114 host performance and state data sources 115 to gather measurements describing the current utilization and health state of the host computer system. The host agent may e.g. be implemented as an individual process which is configured to be started automatically by the operating system of the host computing system and which connects to the same monitoring node 119 as the transaction and process agents 107 deployed to the monitored application processes 102 executed by the host computing system. The host agent 112 cyclically queries measures from various host performance and state data source and creates host infrastructure events 220 which are also tagged with a hostId 113 identifying the host computing system 101 to which the host agent 112 is deployed. The described embodiment contains a distinct host agent which runs in a separate process. However, other variants are possible with one combined agent type that performs process and host monitoring and transaction tracing. In such a setup, multiple agents deployed to multiple processes running on the same host would provide multiple sets of, potentially redundant, host measurements. The monitoring application or monitoring node needs to be aware of this and e.g. discard redundant host measurements or aggregate them. The benefit of such a setup with one agent providing host, process and transaction monitoring and tracing data is an eased installation process because only one type of agent needs to be deployed instead of two.

The monitoring node 119 receives transaction events 201 and forwards them to the transaction correlator 120, which incrementally builds end-to-end tracing data out of the received transaction events. Finished end-to-end tracing data is stored in a transaction repository 122. Additionally, the monitoring node 119 receives process infrastructure events 210 and host infrastructure events 220 to create and update a model of the monitored hosts and processes in an infrastructure repository. In the example embodiment, the monitoring node 111 is further defined as a transaction monitor application which resides on a monitor computer. The infrastructure repository contains correlation data and meta-information about monitored processes and hosts. Additionally, "executed by" relationships may be maintained, showing which process is executed on which host. Next to this structural data, the infrastructure repository 123 also contains measurement data describing current and historic utilization and health measurement of monitored processes and hosts, and health state history data describing current and historic health states of monitored hosts and processes. The process and host health states may be determined by the infrastructure repository by evaluating received measures, using specific health state change rules.

A combined transaction/infrastructure analyzer 124 may receive requests regarding monitored transactional or infrastructure performance problems to detect potential corresponding infrastructure root causes or transactional impacts. The combined analyzer 124 may access transaction repository 122 and infrastructure repository 123 to process received requests and may use a result visualization module 125 to present request results to a user.

Event records to transfer transaction events, process and host infrastructure measures from an agent 107 or 112 to a monitoring node 119 are conceptually displayed in FIG. 2.

Figure 2A:
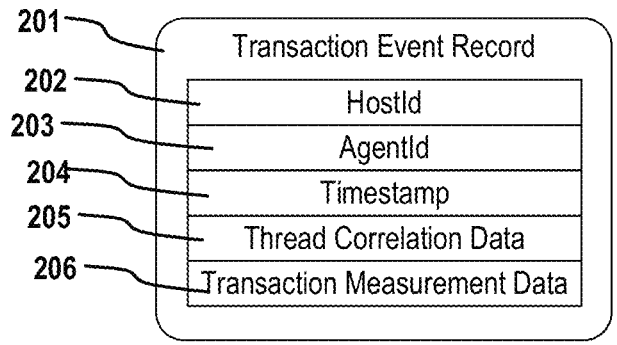

A transaction event record 201 which may be used to represent transaction events, like the start of the execution of a monitored transaction within a specific thread on a specific process on a specific host or the start or end of a monitored method execution within a specific thread is shown in FIG. 2a. Transaction event records 201 may be created by the transaction and process agent 107 on the occurrence of one of the aforementioned events and may then be transferred to an external monitoring node 119 to process the received transaction event records and incrementally create end-to-end transaction tracing data. A transaction event record 201 may contain but is not limited to a hostId 202, identifying the host computing system on which the described event occurred, an agentId 203, identifying the sending agent 107 and also the application process 102 on which the event occurred, a timestamp 204 identifying the point in time when the event occurred, transaction correlation data 205, to identify the thread execution within the application process in which event was recognized, and in case the event describes start or stop of a instrumented method execution, correlation data describing calling sequence and nesting level of instrumented method executions within the thread execution. Additionally, a transaction event record 201 may contain transaction measurement data 206, containing e.g. CPU time used by the monitored method execution, method execution context parameters, like captured values of method call parameters or a captured method return value.

Figure 2B:
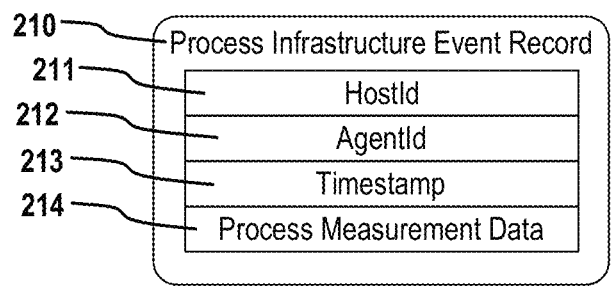

Process infrastructure event records as shown in FIG. 2b may be used to store and transfer process specific utilization and performance measures, like memory or CPU usage of the monitored process, or for processes providing automated memory management, duration and CPU usage of a garbage collection run. A process infrastructure event record 210 may contain but is not limited to a hostId 211, identifying the host computing system executing the monitored process, an agentId 212 identifying the monitored process within the scope of its host computing system, a timestamp 213 storing the point in time when the contained process measures have been captured, and process measurement data 214, containing at least one utilization or performance measure acquired from a process performance and state data source 111.

Figure 2C:
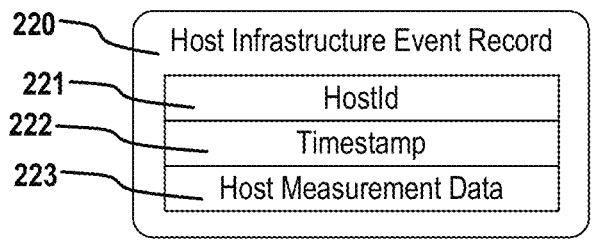

FIG. 2c shows a host infrastructure event record 220 which may be used to transfer host specific utilization and performance measures from a host agent 112 to a monitoring node 119. A host infrastructure event record 220 may contain but is not limited to a hostId 211, identifying the monitored host computing system, a timestamp 222 holding the point in time when the contained host measures have been captured and host measurement data 223 containing at least one host utilization or performance measure as acquired from a host performance and state data source 115. The hostId 202 of a transaction event record 201, which is set by the transaction monitoring part of a transaction and process agent 107, the hostId 211 of a process infrastructure event record 210 which is set by the process monitoring part of a transaction and process agent 107 and the hostId 221 of a host infrastructure event record 220 set by a host agent 112 are calculated and set in a way that allows a correlation of transaction, process and host event records based on the respective hostId. In case a specific process runs on a specific host, a host agent is deployed to the specific host and a transaction and process agent is deployed to the process, then the hostIds 202 of created transaction event records and the hostIds 211 of created process infrastructure events allow to identify correlating host infrastructure events describing the host computer system running the process by comparing the hostId 221 of host infrastructure event records with the hostId 202 of the transaction event record 201. The combination of hostId 202 and agentId 203 of transaction event records 201, describing the execution of a part of a distributed transaction in form of e.g. a thread execution performed by a specific process on a specific host, allow to identify and correlate corresponding process infrastructure event records 210 describing the resource utilization aspects of the same specific process running on the same specific host.

Figure 3:
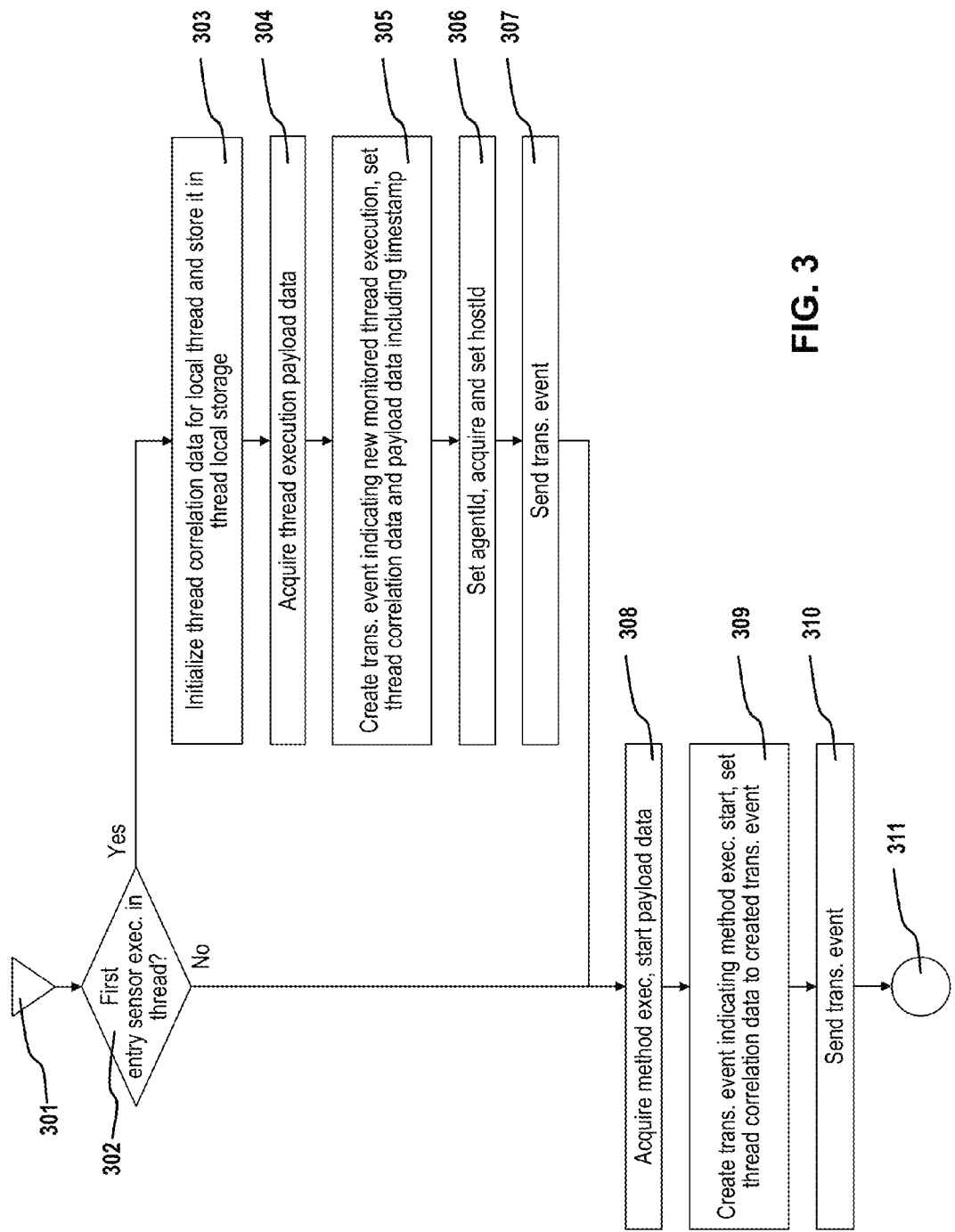

The process of executing an entry sensor 105 is conceptually described in FIG. 3. Entry sensors are instrumented to the entry point of an instrumented method and exit sensors are instrumented to all exits of instrumented methods. They are executed on entry and exit of instrumented methods and produce transaction event records 201 to notify entry and exit of a specific instrumented method according to the teachings of U.S. Pat. No. 8,234,631 which is incorporated in its entirety herein. Entry sensors 105 also detect and notify the start of new thread executions, as an entry sensor 105 detects on its execution if it is the first execution of an entry sensor within the current thread. A thread execution is the largest unit of transaction execution that is guaranteed to be executed by one process. In case a transaction execution switches from one thread execution to another, the thread executions may be performed by different processes on different host computing systems. All monitored instrumented method executions performed within one thread execution are guaranteed to be executed on the same host and on the same process. As a consequence, a transaction event record indicating a new monitored thread execution is ideal to also send agentId 203 and hostId 202 to identify executing process and host.

Transaction event records notifying other events, like a subsequent method entry within a monitored thread execution or transaction event records notifying a method exit may also redundantly contain an agentId and a hostId to improve the robustness of the monitoring system, but conceptually this is not necessary.

Execution of exit sensors is according to the teachings of U.S. Pat. No. 8,234,631 and is omitted here for brevity.

Execution of an entry sensor 105 starts when an instrumented method 104 execution starts in step 301. Subsequent step 302 checks if the current entry sensor execution is the first one within the current thread. A thread local storage may be used for this check, for details see e.g. U.S. Pat. No. 8,234,631. In case the current entry sensor execution is not the first one within the current thread, the process continues with step 308 which acquires payload data describing the current method entry, like method call parameter values or method execution start timestamp. Following step 309 creates a transaction event record 201 and configures it in a way to represent a method entry. Additionally it sets timestamp 204 and payload transaction measurement data 206, thread correlation data 205 to identify the current thread execution and to identify sequence number and nesting level of the current method execution. Step 310 then sends the initialized transaction event record indicating a started method execution to the monitoring node 119. The process then ends with step 311.

In case step 302 determines that the current entry sensor execution is the first within the current thread, execution continues with step 303 which initializes thread correlation data for the current thread and stores it in the local storage of the current thread. This may contain determining a thread execution identifier, which uniquely identifies the new started monitored thread execution within the monitored process and initializing method call sequence and nesting level monitoring data. Subsequent step 304 acquires measurement data associated with the current thread execution, which may e.g. contain the name of the current thread or its priority. Following step 305 creates a transaction event record 201 indicating a new monitored thread execution. Thread correlation data 205 and measurement data 206 are set to the previously acquired values and the timestamp 204 is set to the current time. Following step 306 sets agentId 203 and hostId 202 to the corresponding values of agentId 109 and hostId 108 of the transaction and process agent 107. Subsequent step 307 sends the transaction event record 201 indicating the new thread execution to the monitoring node. The process afterwards continues with step 308.

A process startup parameter, which is forwarded to the transaction and process agent 107, may be used as agentId 109. As a consequence, subsequent executions of one process share the same agentId. Alternatively, a dynamic agentId may be used that identifies a specific process run, like e.g. a processId provided by the operating system, which may, to improve uniqueness, be combined with the process start timestamp. As a consequence, different runs of the same process would have different agentIds. Both approaches can be combined with the methods and technologies herein without leaving the scope and spirit of the invention as long as transaction event records and process infrastructure event records use the same type of agentId.

A network identifier of a host computing system like the IP-address of the host may be used as hostId 108. The prerequisites for a hostId are its uniqueness, i.e. it is sufficient to identify the host computing system, and that its value does not change over time. All agents have to use the same type of hostId.

Figure 4A:
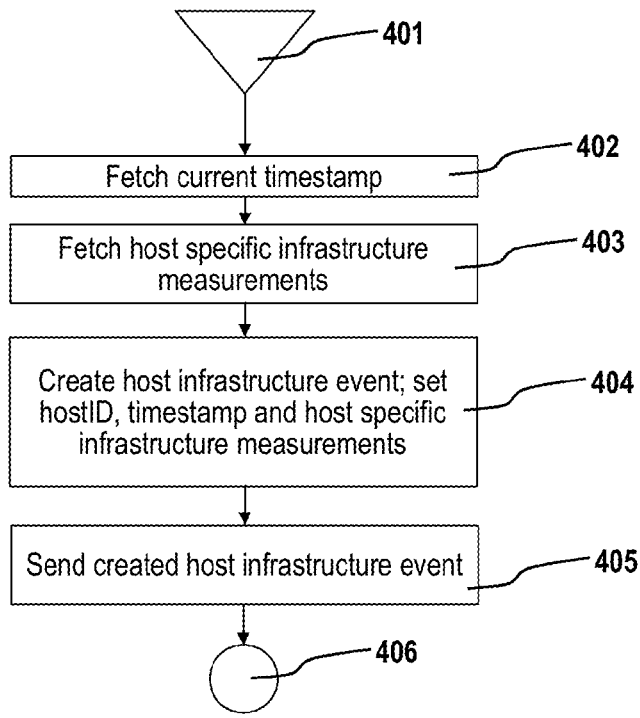
Figure 4B:
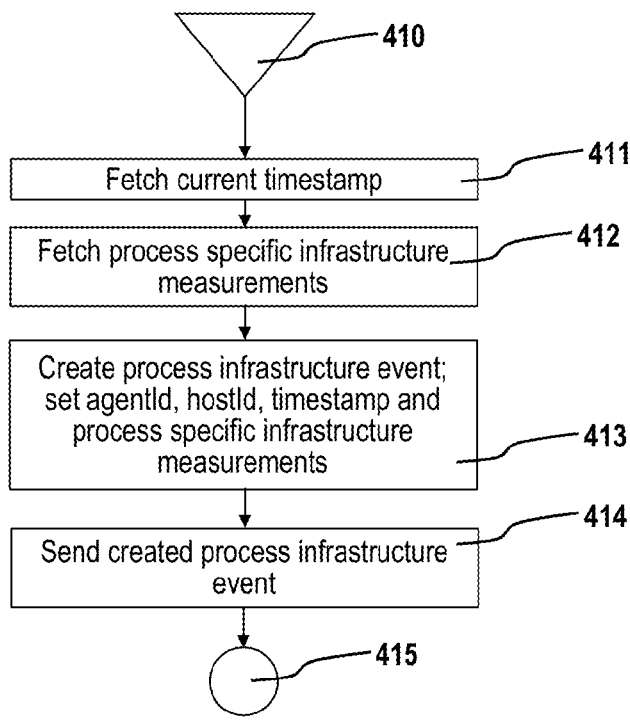

The processes of acquiring host and process infrastructure measures by agents are shown in FIG. 4a and FIG. 4b.

Creation and sending of host infrastructure events 220 by the host agent 112 is shown in FIG. 4a. The process is executed cyclically, e.g. every 10 seconds and starts with step 401. Subsequent step 402 fetches the current timestamp and step 403 fetches host specific infrastructure, utilization and performance measures like disc usages of all connected hard discs, network bandwidth utilization of all network interfaces and CPU and memory utilization. Step 404 afterwards creates a host infrastructure event record 220 and sets its hostId 221 to the hostId 113 of the host agent 112 and stores acquired timestamp and measurements in the corresponding fields 222 and 223 of the created host infrastructure event record 220. Afterwards, the process sends the created event record 220 to the monitoring node 119 and terminates with step 406.

Acquisition of process infrastructure utilization and performance measures by the transaction and process agent 107 is described in FIG. 4b. The process is triggered cyclically, e.g. every 10 seconds and starts with step 410. Subsequent step 411 fetches the current timestamp and step 412 gets process specific infrastructure, utilization and performance measures. Examples for such measures contain memory utilization of the process, CPU usage of the process, number of threads executed by the process, CPU usage and duration of garbage collections in case of a process supporting automatic memory management. Following step 413 creates a process infrastructure event record 210, and sets previously acquired timestamp and measures to the corresponding fields of the created process infrastructure event record 210. Additionally agentId 109 and hostId 108 of the transaction and process agent 107 are fetched and set to the corresponding fields of the created event record 210. Subsequent step 414 sends the created process infrastructure event record 210 to the monitoring node 119 and the process ends with step 415.

Data structures and records to represent infrastructure processing entities like processes and hosts and corresponding measures and health states are shown in FIG. 5.

Figure 5A:
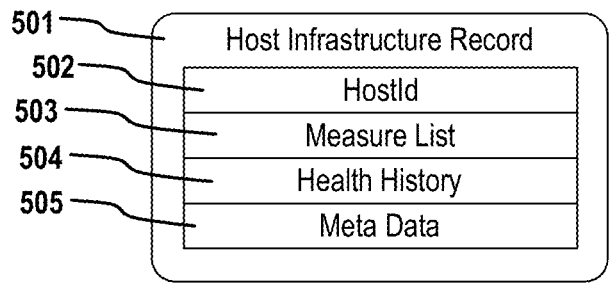

FIG. 5a shows a host infrastructure record 501, which may be used to represent a specific host computer system monitored by a host agent 112. A host infrastructure record 501 may contain but is not limited to a hostId 502, identifying a specific host computer system, a measure list 503, containing historic and current infrastructure, utilization and performance measures of the specific host, and a health history 504, containing historic and current health states of the specific host computer system. The health state of a host computing system may be determined using current and historic measures of the host, together with a set of health state rules. An example for such a health state rule, formulated in prose, would be: if the measured CPU utilization is above 95% since the last 30 seconds, switch the health state to "CPU unhealthy".

Host infrastructure records 501 may also contain a set of meta-data 505 describing the host computing system identified by the hostId 502. Host meta-data may be retrieved and provided by the host agent 112 once on startup and connection to the monitoring node, or cyclically in form of host measures. Examples for host meta-data include but are not limited to name and version of operating system of the host, hardware description parameters like type and number of processors, amount of main memory and size of system discs.

Figure 5B:
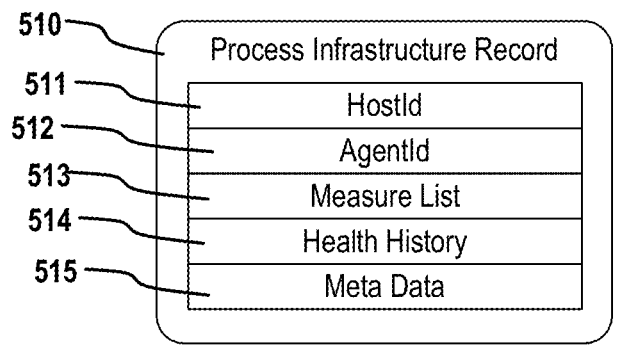

Process infrastructure records 510 as shown in FIG. 5b may be used to represent a specific monitored process running on a specific host. Such a process infrastructure record 510 may contain but is not limited to a hostId 511 identifying the host running the described process, an agentId 512 identifying the described process, a measure list 513 and a health history 514 like a host infrastructure record.

Process infrastructure records 510 may also contain a set of meta-data 515 describing the process, which may be retrieved and provided by the transaction and process agent 107 once on startup and connection to the monitoring node, or cyclically in form of measures. Examples for process meta-data include but are not limited to the command line that started the process or the start time of the process. In case the process runs a virtual machine, meta-data may also include name, vendor and version of the virtual machine.

It is noteworthy that the hostId 511 of a process infrastructure record 510 identifies the host infrastructure record representing the host computer system that executed the process. This represents a "host runs process" relationship and allows the monitoring node to identify which host computing system runs which processes.

Figure 5C:
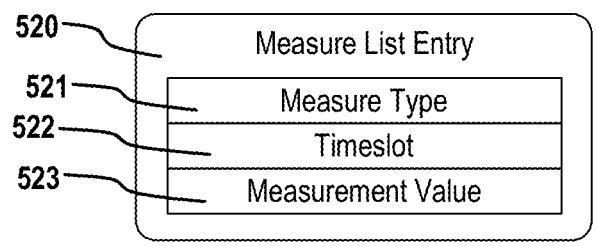

A measure list entry 520 as shown in FIG. 5c may be used to store individual measurements for different measures as part of a measure list 503 or 513. Such a measure list entry may contain but is not limited to a measure type 521, identifying the kind of the measure and the measured parameter, like CPU or memory usage, a timeslot or timestamp 522, identifying the time when the measurement was taken, and a measurement value 523 to store the actual measurement. It is noteworthy that arriving measurements may be assigned to a specific timeslot of a discrete time system of the monitoring node 119 for easier processing and visualization of the measurements.

Figure 5D:
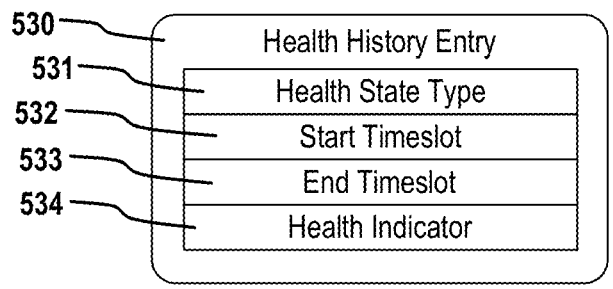

Health history entries 530 as depicted in FIG. 5d may be used to store current and historic health states of a monitored host or process and may be stored in history health lists 504 or 514 of host infrastructure records 501 or process infrastructure records 510.

A health history entry may contain but is not limited to a health state type indicating a specific health condition of a host or process, example health states include", "CPU", "Memory", "Garbage Collection", "Disc", etc., a start timeslot 532 and an end timeslot 533 indicating detected start and end time of a health state and a health indicator 534 indicating the detected health state, example health indicators include "healthy", "critical" or "unhealthy".

Transaction trace data records 601 and method execution data records 610 to represent monitored thread executions and method executions of a traced transaction are shown in FIG. 6.

Figure 6A:
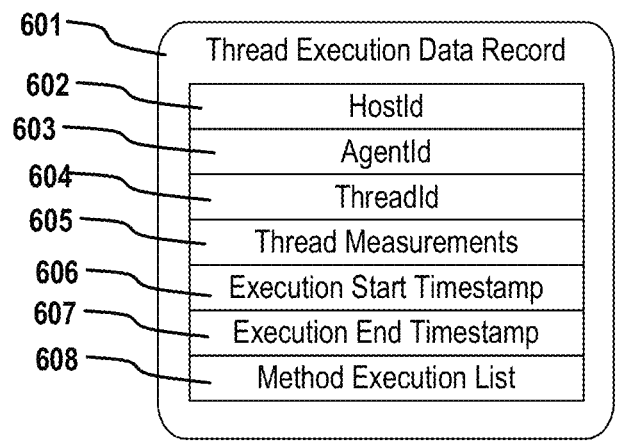

FIG. 6a shows a thread execution data record 601 which may be used to represent a monitored thread execution of a traced transaction. A thread execution data record 601 may contain but is not limited to a hostId 602, identifying the host computer system on which the process that performed the thread execution is executed, an agentId 603 identifying the process which executed the monitored thread, a threadId 604 identifying the thread execution within the process, thread measurements 605 containing measurement data describing the thread execution, like name or the priority of the thread, an execution start timestamp 606 and end timestamp 607 identifying start time and end time of the monitored thread execution, and a method execution list 608 containing method execution data records describing individual monitored method executions.

Figure 6B:
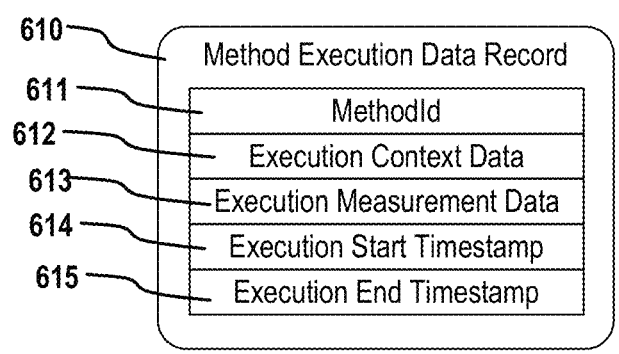

Method execution data records 610 as shown in FIG. 6b may be used to represent individual monitored method executions as part of a monitored thread execution. A method execution data record 610 may contain but is not limited to a methodId 611, identifying the method which was executed, the methodId may contain the name of the method, the name of the class declaring the method and the formal parameter list of the method, execution context data 612 containing captured method parameter or return values as received and returned by the specific method execution, execution measurement data 613 containing additional measurements describing the method execution and an execution start 614 and end 615 timestamp representing the points in time when the method execution started and ended.

Other types of method execution data records may be used to represent method executions that spawned and started other thread executions, potentially on other processes executed on other host computing system. Those types of method execution data records may be used to link different thread execution data records representing different thread executions performed by a monitored transaction to end-to-end transaction tracing data as described in U.S. Pat. No. 8,234,631. A detailed description of this feature is not required for the understanding of the present disclosure and has thus been omitted. However, to fully recognize the benefits of the current disclosure, it is important to consider that end-to-end tracing data consists in multiple, linked thread execution data records, each linked thread execution data record representing an individual thread execution performed by a specific process on a specific host computer system.

Figure 7:
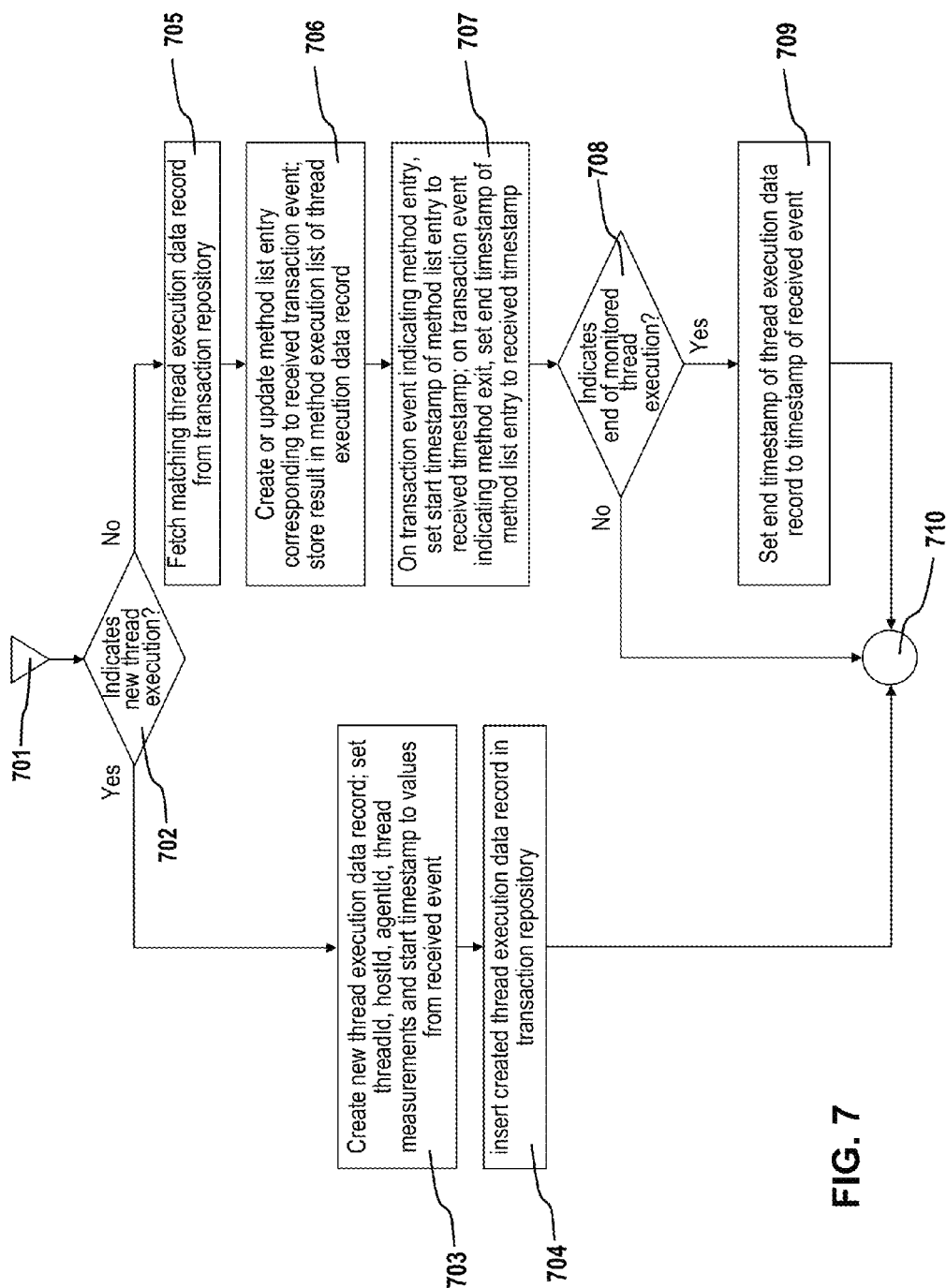
FIG. 7 shows the processing of incoming transaction events by the correlation engine of the monitoring node to build end-to-end tracing data of the monitored transactions.

The processing of transaction event records 201 by the transaction correlation engine 120 is shown in FIG. 7. The process starts with step 701 when the transaction correlation engine 120 receives a transaction event record 201 from a transaction and process agent 107. Subsequent step 702 analyzes the incoming transaction event record to determine if it indicates a new monitored thread execution. In case a new thread execution is indicated, the process continues with step 703, which creates a new thread execution data record and initializes it with data from the received transaction event record 201. HostId 602, agentId 603 and threadId 604 are set to identify host computing system and process executing the thread and to identify the new thread execution within the executing process. Afterwards, step 704 inserts the created thread execution data record 601 into the transaction repository 120. The process then ends with step 710.

In cases step 702 determines that the received transaction event record 201 does not indicate a new monitored thread execution, the process continues with step 705 which uses hostId 202, agentId 203 and the threadId from the thread correlation data 205 to identify the matching thread execution data record 601. The received transaction event record represents start or end of a specific method execution and the found matching thread execution data record 601 represents the thread execution within which the notified method execution was performed. Afterwards, in case the received event record notifies a new started method execution, steps 706 and 707 create a new method execution data record representing a new method execution as notified by the received transaction event record 201 and append it to the method execution list 608 of the thread execution data record 601 found in step 705.

In case the received event record notifies a terminated method execution, the method execution list 608 is searched for the method execution data record 610 representing the terminated method execution by steps 706 and 707. This method execution data record was created and added during the processing of the transaction event record notifying the corresponding method execution start. The found method execution data record 610 is updated to incorporate measurement data received with the incoming transaction event record 201 indicating the termination of the method execution. Additionally, the method execution data record is set to indicate an already finished method execution, e.g. by setting the execution end timestamp 615 to the timestamp 204 of the received transaction event record 201.

Following step 708 checks in case of a notified method execution end if the reported terminated method execution also ends the monitored thread execution. The monitored thread execution is finished, when top level monitored method execution, i.e. the method execution that initially started the monitoring of the thread execution, is finished.

In case step 708 determines that the monitored thread execution is finished, the execution end timestamp 607 of the thread execution data record 601 fetched in step 705 is set to the timestamp 204 of the received transaction event record 201 in step 709. Afterwards, the process ends with step 710.

The process described in FIG. 7 incrementally creates end-to-end transaction tracing data in form of linked thread execution data records which represent the thread executions performed by individual monitored transactions, each thread execution data record containing method execution data records describing the monitored method executions performed within the monitored thread executions. Host and process identification data like hostId 602 and agentId 603 allow to identify the specific host and process that performed a specific thread execution. The timing information about thread executions and method executions in form of start and end timestamps, together with the host and process identification data allow to automatically select matching host and process instances and matching timeframes to identify measurements describing e.g. the utilization of hosts or processes involved in the transaction execution, or even allow to select the utilization measurements relevant for the execution of an individual method.

Figure 8:
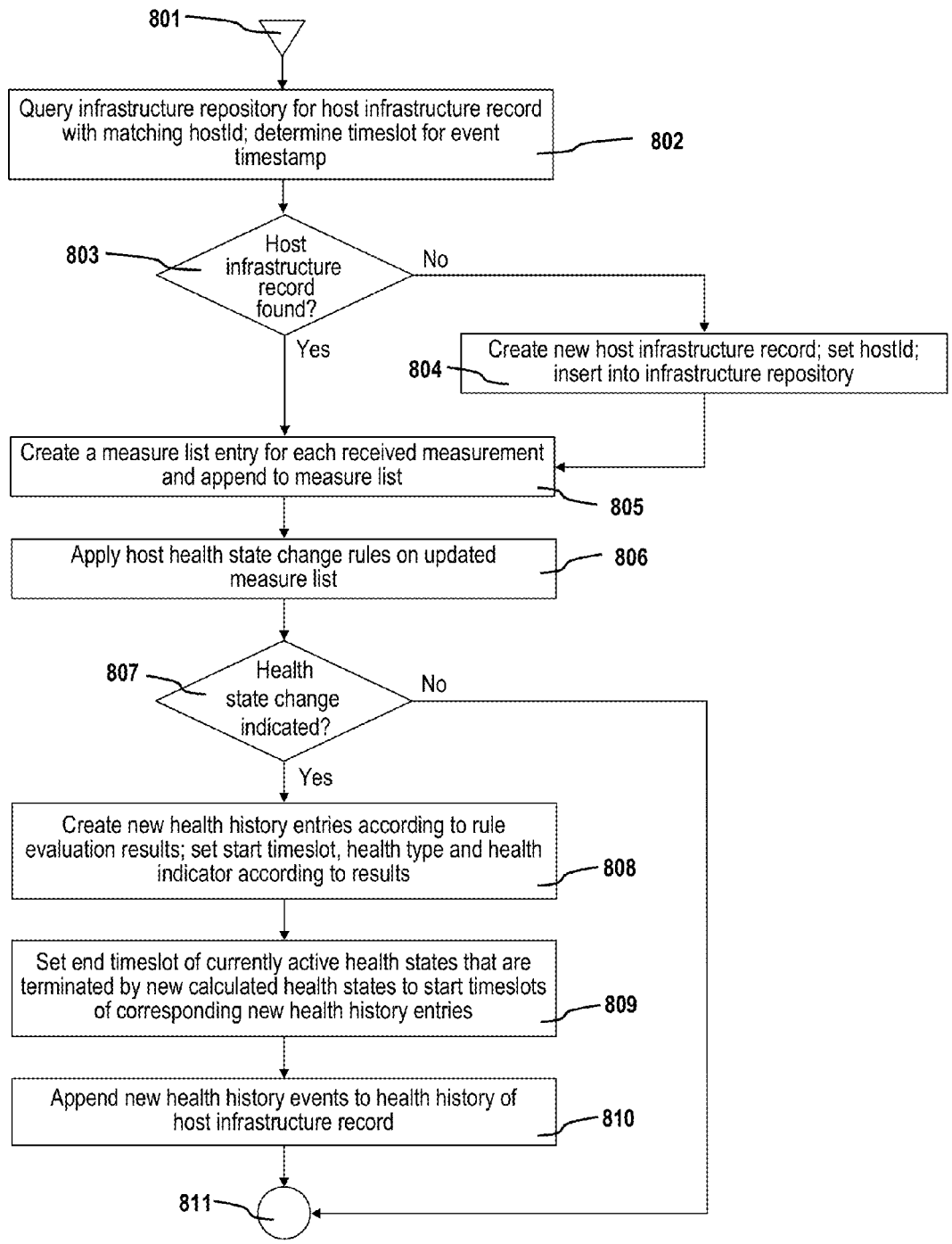
FIG. 8 shows the processing of host infrastructure events to build and update the infrastructure model as reported by host agents, and to update host infrastructure measures and health states according to received measurement values.

The processing of host infrastructure event records 220 by the infrastructure event processor 121 is depicted in FIG. 8. Host infrastructure event records 220 are cyclically created and sent by a host agent 112.

The process starts with step 801 when the infrastructure event processor 121 receives a host infrastructure event record 220 and continues with step 802 which queries the infrastructure repository 123 for a host infrastructure record 501 with matching hostId 502. Additionally, step 802 may determine the matching timeslot for the timestamp 222 received with the host infrastructure event record in case the measurement representation uses a discrete time system with a specific maximal temporal resolution to improve memory and processing efficiency.

As an example a 10 second time system may be used, which segments the time into consecutive 10 second slots. Incoming timestamps may e.g. be aligned to the start time of the time slot containing the timestamp.

In case no matching host infrastructure record 501 was found in step 803, the process continues with step 804 which creates a new host infrastructure record 501, sets its hostId 502 to the hostId 221 received with the host infrastructure event record 220 and inserts it into the infrastructure repository 123. Step 804 may also extract and set meta-data 505 describing the new detected host. Afterwards the process continues with step 805 which creates a measure list entry for each measurement in the host measurement data 223 of the received host infrastructure event record 220. Measure type and measure value may be extracted from each received host measurement and set to a new created measure list entry 520. Additionally, the timeslot determined in step 802 may be set to the timeslot 522 of each created measure list entry. The created measure list entries 520 are then appended to the measure list 503 of the host infrastructure record 501 found or created in step 802 or 804.

Afterwards, step 806 applies host health state change rules on the updated measure list to determine potential changes of the health state of the host. Exemplary host health change rules would e.g. contain "change CPU health to unhealthy after a CPU usage higher than 90% seen for 30 seconds", "change disc health to unhealthy after a disc usage of more than 95%", "change memory health to unhealthy after a memory usage higher than 90%" or "change memory health to healthy after memory usage below 60%". In case no host health changes are detected, the process ends with step 811.

In case the health state change rules indicate deviations to the current health state of the host, the process continues with step 808, which creates new health history entries indicating the new health state of the host. Health state 531 and health indicator 534 are set according to the health rule evaluation results, start timeslots are set to the currently active timeslot. Health history entries 530 in the health history list 504 indicating the corresponding health state before the current update are modified by setting the end timeslot 533 to the current timeslot, indicating termination of the specific previous health state.

Afterwards step 810 appends the new created health history entries to the health history list 504 of the host infrastructure record 501. The process then ends with step 811.

Figure 9:
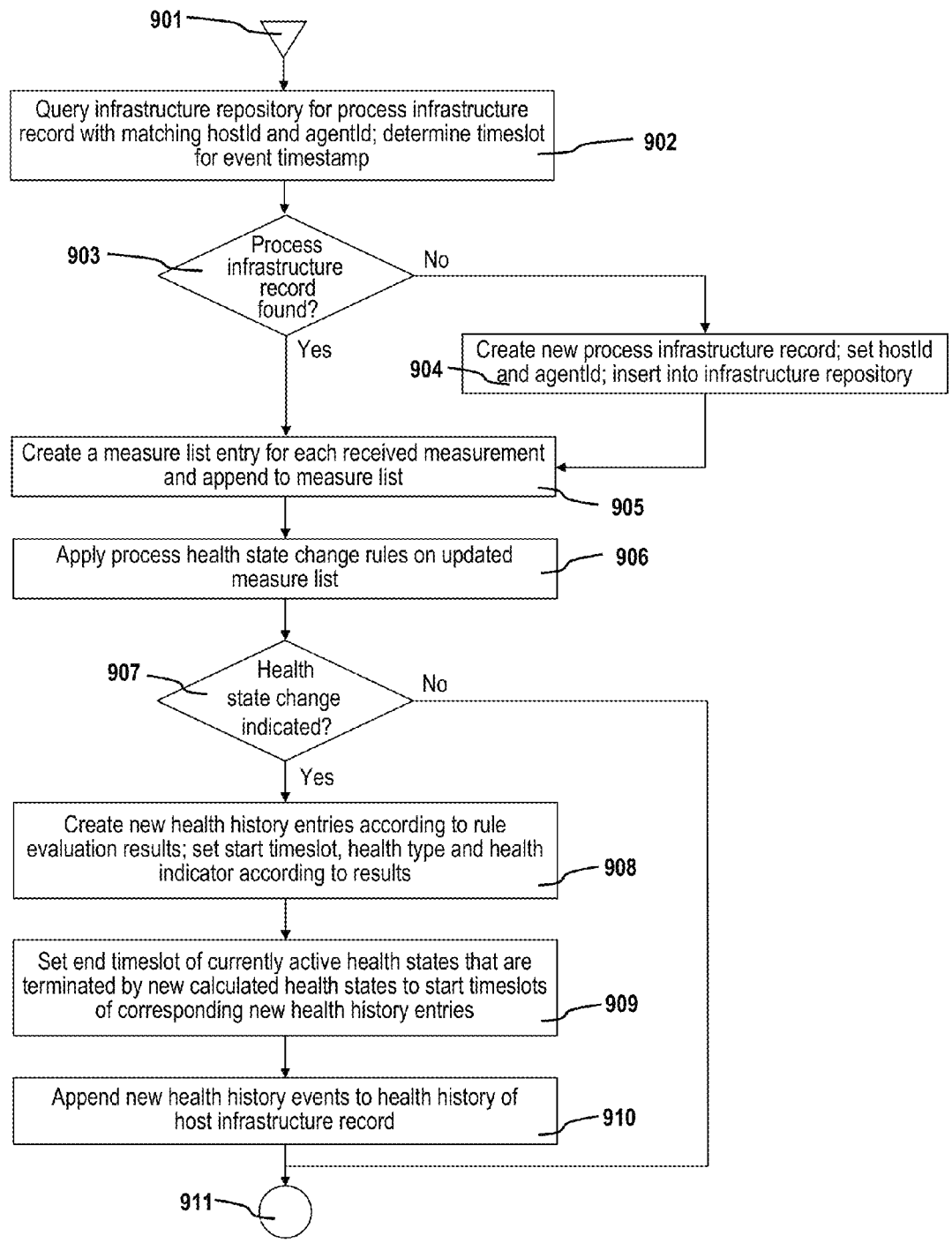
FIG. 9 shows the processing of process infrastructure events to build and update the infrastructure model as reported by process agents, and to update process infrastructure measures and health states according to received measurement values.

The processing of process infrastructure event records 210 by the infrastructure event processor 121 is described in FIG. 9. The process starts when the infrastructure event processor 121 receives a process infrastructure event record 210 in step 901. Subsequent step 902 checks if a process infrastructure record 510 with matching hostId 511 and agentId 512 exists in the infrastructure repository 123. In case no one exists, the process continues with step 904 which creates a new process infrastructure record, sets hostId 511 and agentId 512 to the corresponding values of the received process infrastructure event record and inserts the created process infrastructure record into the infrastructure repository 123. Step 904 may also extract and set meta-data 515 describing the new detected process. Afterwards, or if step 902 found a matching process infrastructure record, the process continues with step 905, which creates a new measure list entry 520 for each received measure and appends it to the measure list 513 of the process infrastructure record. Following steps 907 to 910 use process health state change rules to determine if updates of the process health states are required. Required health state updates are performed similar to health state updates for host infrastructure records. Exemplary process specific health change rules may e.g. include "change memory health state to unhealthy if used memory exceeds 80% of maximal allowed memory for the process", "change CPU state to unhealthy if process uses more than 60% of the CPU resources of the host, or for processes with garbage collector based memory management, like e.g. processes running a Java™ virtual machine, "change GC health state to unhealthy after a detected full GC run causing a suspension of the virtual machine that lasted more than 10 seconds" After finished health state updates, the process ends with step 911.

An exemplary usage of the combined transaction tracing and infrastructure monitoring data stored in transaction repository 122 and infrastructure repository 123 by the combined transaction/infrastructure analyzer 124 is shown in FIG. 10. A monitored method execution as part of a thread execution performing a portion of a monitored end-to-end transaction is detected which exceed its maximum allowed execution duration. The transaction tracing data provides no transaction related data explaining the increased execution time, like increased amount of methods called by the threshold exceeding method.

The process starts with step 1001 when the combined analyzer 124 receives a request to detect potential infrastructure based causes for a specific monitored method execution as part of a specific monitored end-to-end transaction which exceeded maximum execution duration. Subsequent step 1002 queries the infrastructure repository 123 for a process infrastructure record with hostId 511 and agentId 511 matching hostId 602 and agentId 603 of the thread execution data record 601 containing the method execution data record 610 representing the limit exceeding method execution. The fetched process infrastructure record represents the process that executed the problematic method.

Subsequent step 1003 first extracts the execution start time 614 and the execution end time 615 from the method execution data record 610 representing the limit exceeding method execution. Afterwards, the health history 504 of the found process infrastructure record 501 is queried for health states potentially causing the delayed method execution. Such health states may e.g. be an unhealthy CPU state, partially or fully overlapping the method execution duration, or in case of processes providing automatic memory management, a full garbage collection run performed during method execution. In case step 1003 identifies a matching performance degradation cause of the method executing process, step 1005 is executed which triggers the result visualization 125 to show the process health problem that occurred during method execution as root cause of the performance degradation. The process then ends with step 1006.

Otherwise, the process continues with step 1007, which uses the hostId 602 of the thread execution data record 601 containing the problematic method execution data record 610 to query the infrastructure repository 123 for other processes executed on the same host. In case other monitored processes running on the same host (i.e. having same hostId 511 and different agentId 512) are found, step 1007 further checks if the host health history of one or more of the other processes show an unhealthy state during execution of the problematic method. In case such unhealthy states of other monitored processes on the same host are found, the process continues with step 1009 and notifies health problems on other monitored processes executed on the same host computer as root cause of the performance degradation. The process then ends with step 1010.

In case no health problems of other monitored processes on the same host are found, the infrastructure repository is queried in step 1011 for the host infrastructure record representing the host on which the problematic method was executed. Subsequent step 1012 queries the health history 504 of the found host infrastructure record 501 for reported health problems during the method execution.

In case one or multiple host health problems are found, the process continues with step 1014 which notifies the host health problems as root cause for the performance degradation. Examples for such host related problems are e.g. a full primary hard disc, a CPU or memory usage of more than 90% for a time period longer than 30 seconds. The process then ends with step 1015.

In case no matching host health problem was detected in step 1012, the process continues with step 1016 which notifies other, not monitored processes running on the host as potential root cause of the performance degradation. The process then ends with step 1017.

Exemplary queries of combined infrastructure monitoring and transaction tracing data based on a detected health problem on a process or host, aimed to find transaction executions potentially impacted by the infrastructure health problem are shown in FIG. 11.

A query for transactions potentially affected by a process health problem is displayed in FIG. 11a. The query processing starts with step 1101, when the query processor receives data describing a health problem on a specific process. The provided data may consist in a process infrastructure record 510 identifying the process on which the health problem occurred and one or more health history entries 530 of the health history list 514 of the process infrastructure record to identify kind and duration of the health problem. Subsequent step 1102 queries the transaction repository 122 for transaction tracing data containing thread executions performed by the process on which the health problem occurred. (I.e. searching for thread execution data record 601 with same hostId 602 and agentId 603 as the received process infrastructure record 510.)

The thread execution data records 601 retrieved by step 1102 are filtered by step 1103 using their execution start time and execution end time to identify those thread executions that have a full or partial temporal overlap with the received process health problem.

End-to-end tracing data containing at least one thread execution identified by steps 1102 and 1103 are returned as transaction executions potentially affected by the received process health problem by step 1104. The process then ends with step 1105. The returned end-to-end tracing data may be used by the result visualization to show transactions potentially affected by the provided process health problem.

A query for monitored transactions potentially affected by a host health problem is show in FIG. 11*b*. In a first step 1110, the combined analyzer 124 receives a host infrastructure record 501 identifying the host on which the health problem occurred, and one or more health history entries 530 identifying kind and duration of the health problem. In subsequent step 1111, the combined analyzer 124 queries the transaction repository 122 for thread execution data records 601 with a hostId 602 matching the hostId 502 of the received host infrastructure record 501.

Subsequent step 1112 filters those thread execution data records 601 having an execution period that partially or fully overlaps with the duration of the received host health problem.

End-to-end transaction tracing data containing at least one of the thread execution data records identified by steps 1111 and 1112 are returned as transaction executions potentially affected by the host health problem in step 1113. The process ends afterwards with step 1114. The returned end-to-end tracing data may be used by the result visualization.

Various other queries using the combined monitoring and transaction tracing data are possible. Another example would e.g. an execution hotspot query, which analyzes a set of transaction traces and identifies hosts or processes which are used by most or all of the analyzed transactions and reports them as hotspots. Such information may be valuable to improve the availability of an application by adding failover mechanisms etc. because it reveals those processes and hosts required by most of the executed transactions. The availability of the monitored application would benefit most from measures to improve the availability, like e.g. failover mechanisms, if they are applied to those hotspot processes or hosts.

A screen shot showing an exemplary visualization of combined transaction tracing and infrastructure monitoring data is shown in FIG. 12.

An individual transaction is shown, which enters the monitored application via a web request which is received by a host computing system running a process providing a service for web requests 1201*a* that receives and servers the request. The visualization of the process contains three color coded segments of a circle, representing a health overview of host 1202, process 1203 and transaction 1204. Health overview of host and process may use aforementioned health history entries and may be colored according to the worst current health state of host or process. If e.g. the process health state of CPU and memory is healthy, but the garbage collection state is unhealthy, then the process health overview state would indicate an unhealthy state. The transaction oriented health overview may e.g. use execution time thresholds set for specific methods. In case one threshold is exceeded, the transaction health overview may indicate an unhealthy state.

The web service process 1201*a* may perform some internal request processing and then forward a request to a process providing eService services 1201*b* running on another host, which may again send requests to other processes 1201*c*, 1201*d* or 1201*e* to fulfill the initial request.

If the user clicks on a host/process representation in the transaction visualization, detailed health information of process 1205 and host 1206 are shown. Additionally, links to details about the application process 1207 and the host 1208 are presented.

An exemplary visualization of detailed infrastructure and utilization measures of a specific host and a specific process is shown in FIG. 13.

FIG. 13*a* shows detail health data of a specific host and may be presented to the user in case of a click on the host details link 1208 in the visualization of a transaction execution as shown in FIG. 12. The overview visualization of a host 1301 may contain a host meta-data section 1302, showing details of the hardware configuration of the host in addition to information about the operating system of the host computing system. Additionally it contains visualizations of historic and current infrastructure and utilization measures 1303 of the described host computing system and an overview of monitored processes executed on the host, 1304.

An exemplary visualization of process infrastructure and utilization data is shown in FIG. 13*b*. This view may be presented to the user after clicking on the application process details link 1207 in a visualization of a transaction execution as shown in FIG. 12.

A process detail view 1310 may contain a meta-data section 1311, showing details of the process, like type, vendor and version of a virtual machine executed by the process. Additionally a process detail view may contain visualizations of current and historic infrastructure and utilization measures of the described process, 1312.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance of an application executing on a host computing device, comprising:

generating, by a transaction agent instrumented in the application, a transaction event caused by execution of the application, where the transaction event includes an identifier for the host computing device, an identifier for an execution thread that caused the transaction event, and at least one transaction metric indicative of application performance;

sending, by the transaction agent, the transaction event across a network to a server computer located remotely from the host computing device;

generating, by a host agent executing on the host computing device, a host event, where the host event includes the identifier for the host computing device and at least one host metric indicative of utilization of a computing resource of the host computing device during execution of the application;

sending, by the host agent, the host event across the network to the server computer;

receiving, by a transaction correlator residing on the server computer, the transaction event;

determining, by the transaction correlator, whether the transaction event corresponds to a thread execution record residing in a transaction repository, where thread execution records includes an identifier for the host computing device, an identifier for the execution thread that caused the transaction event, and at least one transaction metric;

updating, by the transaction correlator, a given thread execution record residing in the transaction repository when the transaction event corresponds to the given thread execution record;

creating, by the transaction correlator, a thread execution record for the transaction event when the transaction event does not correspond to a thread execution record in the transaction repository;

correlating, by an analyzer residing on the server computer, the transaction event with the host event using the identifier for the host computing device and when the thread execution record overlaps temporally with the host event, wherein the thread execution record includes an execution start time and an execution end time for the execution thread;

receiving, by an infrastructure processor residing on the server computer, the host event;

determining, by the infrastructure processor, whether the host event corresponds to a host record in an infrastructure repository; where host records in the infrastructure repository include an identifier for the host computing device, and at least one host metric for the host computing device;

creating, by the infrastructure processor, a host record for the host event when the host event does not correspond to a host record in the infrastructure repository;

creating, by the infrastructure processor, a measurement entry for each host metric encapsulated in the host event, where the measurement entries are associated with a host record in the infrastructure repository corresponding to the host event; and determining a health state for a given host metric by applying a rule set to measurement entries for the given host metric and logging the health state in the infrastructure repository.

2. The method of claim 1 wherein determining a health state further comprises determining a change in the health state for the given host metric;

creating a new health history entry for the given host metric in the infrastructure repository in response to the determination of a change in the health state of the given host metric, where the new health history entry indicates a health state for the given host metric and includes a start time indicating the time when the health state change occurred; and updating a previous health history entry for the given host metric with an end time for the previous health state, the updating of the previous health entry in response to the determination of a change in the health state of the given host metric.

3. The method of claim 1 further comprises generating, by a process agent executing on the host computing device, a process event, where the process agent is associated with a process that at least partially executed the application and the process event includes an identifier for the host computing device, an identifier for the process agent and at least one process metric indicative of utilization of a computing resource of the host computing device caused solely by execution of the process;

sending, by the process agent, the process event across the network to the server computer.

4. The method of claim 3 further comprises correlating the transaction event with the process event when the transaction event overlaps temporally with the process event and using the identifier for the host computing device, the transaction event is associated with the process and the host identifier of the transaction vent matches the host identifier of the process event.

5. The method of claim 3 further comprises receiving, by an infrastructure processor residing on the server computer, the process event;

determining, by the infrastructure processor, whether the process event corresponds to a process record in an infrastructure repository; where each process record includes an identifier for the host computing device, an identifier for the process agent and at least one process metric;

creating, by the infrastructure processor, a process record for the process event when the process event does not correspond to a process record in the infrastructure repository; and creating, by the infrastructure processor, a measurement entry for each process metric encapsulated in the process event, where the measurement entries are associated with a process record in the infrastructure repository corresponding to the process event.

6. The method of claim 5 further comprises correlating, by the analyzer, host records residing in the infrastructure repository with process records residing in the infrastructure repository using a matching identifier for the host computing device and thereby determine which process is executed on which host computing device.

7. The method of claim 5 further comprises correlating, by the analyzer, thread execution records residing in the transaction repository with process records residing in the infrastructure repository using an identifier for the transaction agent that matches with an identifier for the process agent and a matching identifier for the host computing device and thereby determine which thread execution was performed in which process on which host computing device.

8. The method of claim 5 further comprises determining a health state for a given process metric by applying a rule set to measurement entries for the given process metric and logging the health state in the infrastructure repository.

9. The method of claim 8 wherein determining a health state for a given process metric further comprises determining a change in the health state for the given process metric;

creating a new health history entry for the given process metric in the infrastructure repository in response to the determination of a change in the health state of the given process metric, where the new health history entry indicates a health state for the given process metric and includes a start time indicating the time when the health state change occurred; and updating a previous health history entry for the given process metric with an end time for the previous health state, the updating of the previous health entry in response to the determination of a change in the health state of the given process metric.

10. The method of claim 9 further comprises identifying interdependencies between execution performance of a transaction and health states of computing infrastructure underlying the transaction.

11. The method of claim 8 further comprises receiving, by the analyzer, a request to determine potential causes for performance degradation of a given method execution associated with the application;

querying, by the analyzer, the infrastructure repository for health states of process metrics that are associated with the given method execution and overlap temporally with the given method execution; and presenting, by the analyzer, the health states for the process metrics associated with the given method execution.

12. The method of claim 11 further comprises determining, by the analyzer, a potential cause for the performance degradation of a given method execution from the health states of the process metrics associated with the given method execution;

querying, by the analyzer, the infrastructure repository for health states of process metrics associated with process records for processes executed on the host computing device but not associated with the given method execution, where the health state for the process metrics overlap temporally with the given method execution and the querying is performed in absence of a potential cause for the performance degradation; and presenting, by the analyzer, the health states for the process metrics associated with the processes executed on the host computing device but not associated with the given method execution.

13. The method of claim 12 further comprises determining, by the analyzer, a potential cause for the performance degradation of a given method execution from the health states of the host metrics associate with the host computing device on which the given method execution was performed;

querying, by the analyzer, the infrastructure repository for health states of host metrics that overlap temporally with execution of the given method execution, where the querying is performed in absence of a potential cause for the performance degradation; and presenting, by the analyzer, the health states for the host metrics.

14. The method of claim 13 further comprises querying the infrastructure repository for health states that overlap temporally with the given method execution and have an identifier for a host computing device that corresponds to the given method execution, where the request to determine potential causes includes a start time for the given method execution and an end time for the given method execution.

15. The method of claim 8 further comprises
receiving, by the analyzer, a request to identify transactions caused by execution of the application and affected by a particular health problem, where the request includes an identifier for the host computing device and an identifier for the process agent associated with the particular health problem;
querying, by the analyzer, the transaction repository for execution threads that match the identifier for the host computing device and the identifier for the process agent from the request and overlap temporal with the particular health problem.

16. The method of claim 8 further comprises
receiving, by the analyzer, a request to identify transactions affected by a particular health problem, where the request includes an identifier for the host computing device associated with the particular health problem;
querying, by the analyzer, the transaction repository for execution threads that match the identifier for the host computing device and overlap temporal with the particular health problem.

17. A computer-implemented method for monitoring performance of an application executing on a host computing device, comprising:
generating, by a transaction agent instrumented in the application, a transaction event caused by execution of the application, where the transaction event includes an identifier for the host computing device, an identifier for an execution thread that caused the transaction event, and at least one transaction metric indicative of application performance;
sending, by the transaction agent, the transaction event across a network to a server computer located remotely from the host computing device;
generating, by a process agent executing on the host computing device, a process event, where the process agent is associated with a process that at least partially executed the application and the process event includes an identifier for the host computing device, an identifier for the process agent and at least one process metric indicative of utilization of a computing resource of the host computing device caused solely by execution of the application;
sending, by the process agent, the process event across the network to the server computer;
receiving, by a transaction correlator residing on the server computer, the transaction event;
determining, by the transaction correlator, whether the transaction event corresponds to a thread execution record residing in a transaction repository, where thread execution records includes an identifier for the host computing device, an identifier for the execution thread that caused the transaction event, and at least one transaction metric;
updating, by the transaction correlator, a given thread execution record residing in the transaction repository when the transaction event corresponds to the given thread execution record;
creating, by the transaction correlator, a thread execution record for the transaction event when the transaction event does not correspond to a thread execution record in the transaction repository;
correlating, by an analyzer residing on the server computer, the transaction event with the process event using the identifier for the host computing device and when the transaction event overlaps temporally with the process event, wherein the thread execution record further includes an execution start time and an execution end time for the execution thread;
receiving, by an infrastructure processor residing on the server computer, the process event;
determining, by the infrastructure processor, whether the process event corresponds to a process record in an infrastructure repository; where each process record includes an identifier for the host computing device, an identifier for the process agent and at least one process metric;
creating, by the infrastructure processor, a process record for the process event when the process event does not correspond to a process record in the infrastructure repository;
creating, by the infrastructure processor, a measurement entry for each process metric encapsulated in the process event, where the measurement entries are associated with a process record in the infrastructure repository corresponding to the process event;
correlating, by the analyzer, thread execution records residing in the transaction repository with process records residing in the infrastructure repository using an identifier for the transaction agent that matches with an identifier for the process agent and a matching identifier for the host computing device and thereby determine which thread execution was performed in which process on which host computing device; and
determining a health state for a given process metric by applying a rule set to measurement entries for the given process metric and logging the health state in the infrastructure repository.

18. A computer-implemented system that monitors transaction execution in a distributed computing environment, comprising:
a transaction agent instrumented in an application residing on a host computer, the transaction agent generates one or more transaction events caused by execution of the application and sends the transaction events across a network to a monitoring computer, each transaction event includes an identifier for the host computer, an identifier for an execution thread that caused the transaction event and at least one transaction metric indicative of performance of the application, the transaction agent implemented by computer executable instructions stored in a computer memory and executed by a processor of the host computer;
a host agent residing on the host computer, the host agent generates one or more host events and sends the host events across the network to the monitoring computer, each host event includes the identifier for the host computer and at least one host metric indicative of utilization of a computing resource of the host computer during execution of the application, the host agent implemented by computer executable instructions stored in a computer memory and executed by a processor of the host computer;
a monitor configured to receive a transaction event and a host event from the host computer and correlate the transaction event with the host event using the identifier for the host computer and when the transaction event overlaps temporally with the host event, wherein each transaction event further includes an execution start time or an execution end time for the execution thread and where the monitor resides on the monitoring computer and is executed by a processor of the monitoring computer;

a transaction repository residing on the monitoring computer, wherein the monitor determines whether the transaction event corresponds to a thread execution record in the transaction repository, updates a given thread execution record in the transaction repository when the transaction event corresponds to the given thread execution record; and creates a thread execution record for the transaction event when the transaction event does not correspond to a thread execution record in the transaction repository, where thread execution records includes an identifier for the host computing device, an identifier for the execution thread that caused the transaction event, and at least one transaction metric;

an infrastructure repository on the monitoring computer, wherein the monitor determines whether the host event corresponds to a host record in the infrastructure repository, creates a host record for the host event when the host event does not correspond to a host record in the infrastructure repository; and creates a measurement entry for each host metric encapsulated in the host event, where the measurement entries are associated with a host record in the infrastructure repository corresponding to the host event and the host records in the infrastructure repository include an identifier for the host computer, and at least one host metric for the host computer; and wherein the monitor determines a health state for a given host metric by applying a rule set to measurement entries for the given host metric and logging the health state in the infrastructure repository.

19. The system of claim 18 wherein the monitor further determines a change in the health state for the given host metric; creates, in response to the determination of a change in the health state of the given host metric, a new health history entry for the given host metric in the infrastructure repository, where the new health history entry indicates a health state for the given host metric and includes a start time indicating the time when the health state change occurred; and updates, in response to the determination of a change in the health state of the given host metric, a previous health history entry for the given host metric with an end time for the previous health state.

20. The system of claim 19 further comprises a process agent associated with a process that at least partially executed the application, the process agent generates a process event and sends the process event across the network to the monitoring computer, where the event includes an identifier for the host computer, an identifier for the process agent and at least one process metric indicative of utilization of a computing resource of the host computer caused solely by execution of the process.

21. The system of claim 20 wherein the process agent is instrumented in bytecode for the process.

22. The system of claim 19 wherein the monitor determines whether the process event corresponds to a process record in the infrastructure repository; creates a process record for the process event when the process event does not correspond to a process record in the infrastructure repository; and creates a measurement entry for each process metric encapsulated in the process event, where the measurement entries are associated with a process record in the infrastructure repository corresponding to the process event and each process record includes an identifier for the host computer, an identifier for the process agent and at least one process metric.

23. The system of claim 22 wherein the monitor correlates host records residing in the infrastructure repository with process records residing in the infrastructure repository using a matching identifier for the host computer and thereby determine which process is executed on which host computer.

24. The system of claim 23 wherein the monitor correlates thread execution records residing in the transaction repository with process records residing in the infrastructure repository using an identifier for the transaction agent that matches with an identifier for the process agent and a matching identifier for the host computer and thereby determines which thread execution was performed in which process on which host computer.

25. The system of claim 24 wherein the monitor determines a health state for a given process metric by applying a rule set to measurement entries for the given process metric and logging the health state in the infrastructure repository.

26. The system of claim 25 wherein the monitor determines a change in the health state for the given process metric; creates, in response to the determination of a change in the health state of the given process metric, a new health history entry for the given process metric in the infrastructure repository, where the new health history entry indicates a health state for the given process metric during a timeslot and includes a start time for the timeslot and an end time for the timeslot; and updates, in response to the determination of a change in the health state of the given process metric, a previous health history entry for the given process metric with an end time for the previous health state.

27. The system of claim 18 wherein the transaction agent is instrumented in bytecode for the application.

28. The system of claim 18 wherein the application is further defined as a web browser and the transaction agent is instrumented in JavaScript code of the application and identifies elements in a document object model that contains request directives and instruments an identified element with a sensor.

29. The system of claim 28 wherein the request directive is defined as content update request directive or content load request directive.

30. The system of claim 28 wherein the request directive is defined as resource request directive.

* * * * *